United States Patent Office 3,244,445
Patented Apr. 5, 1966

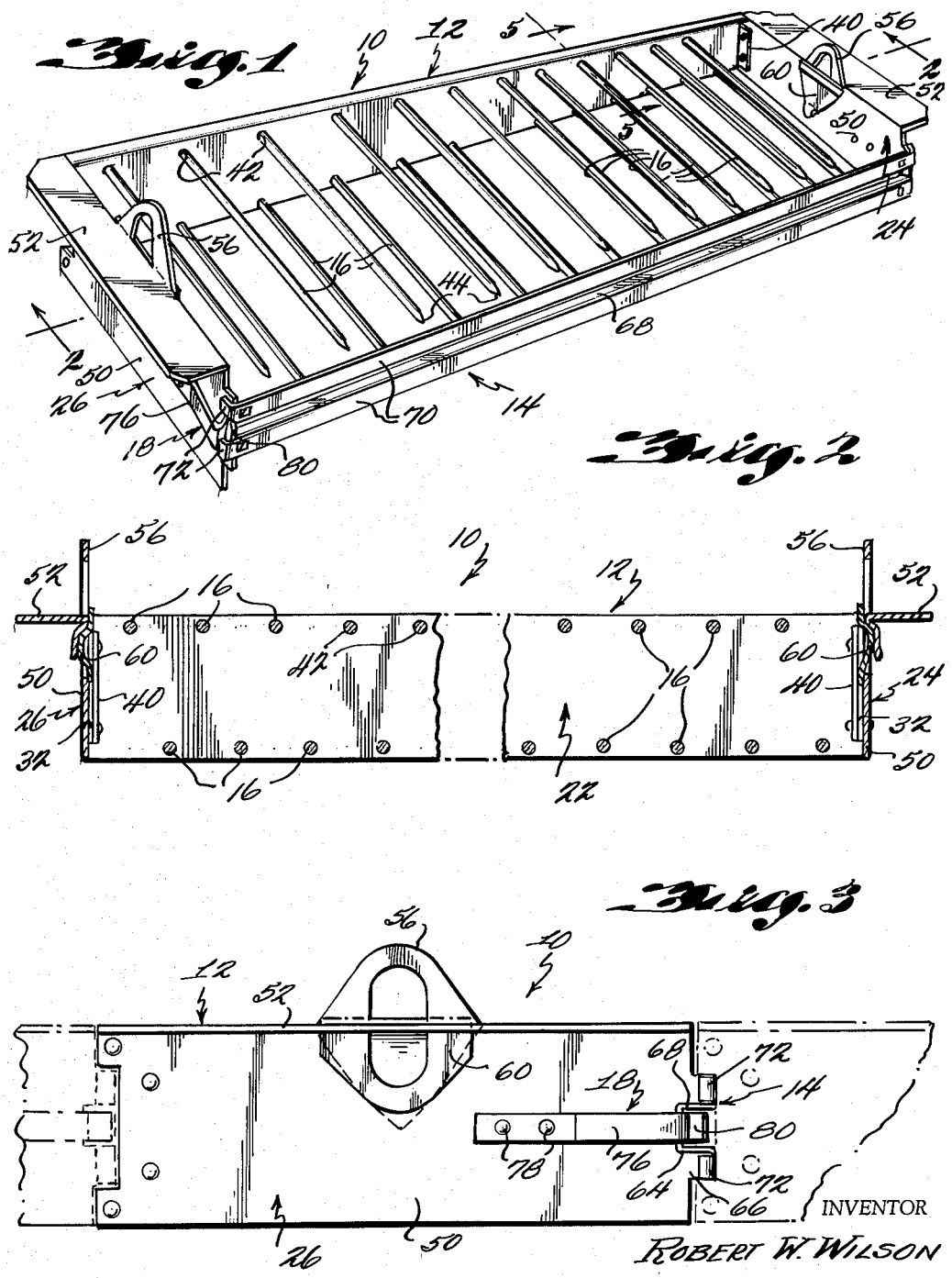

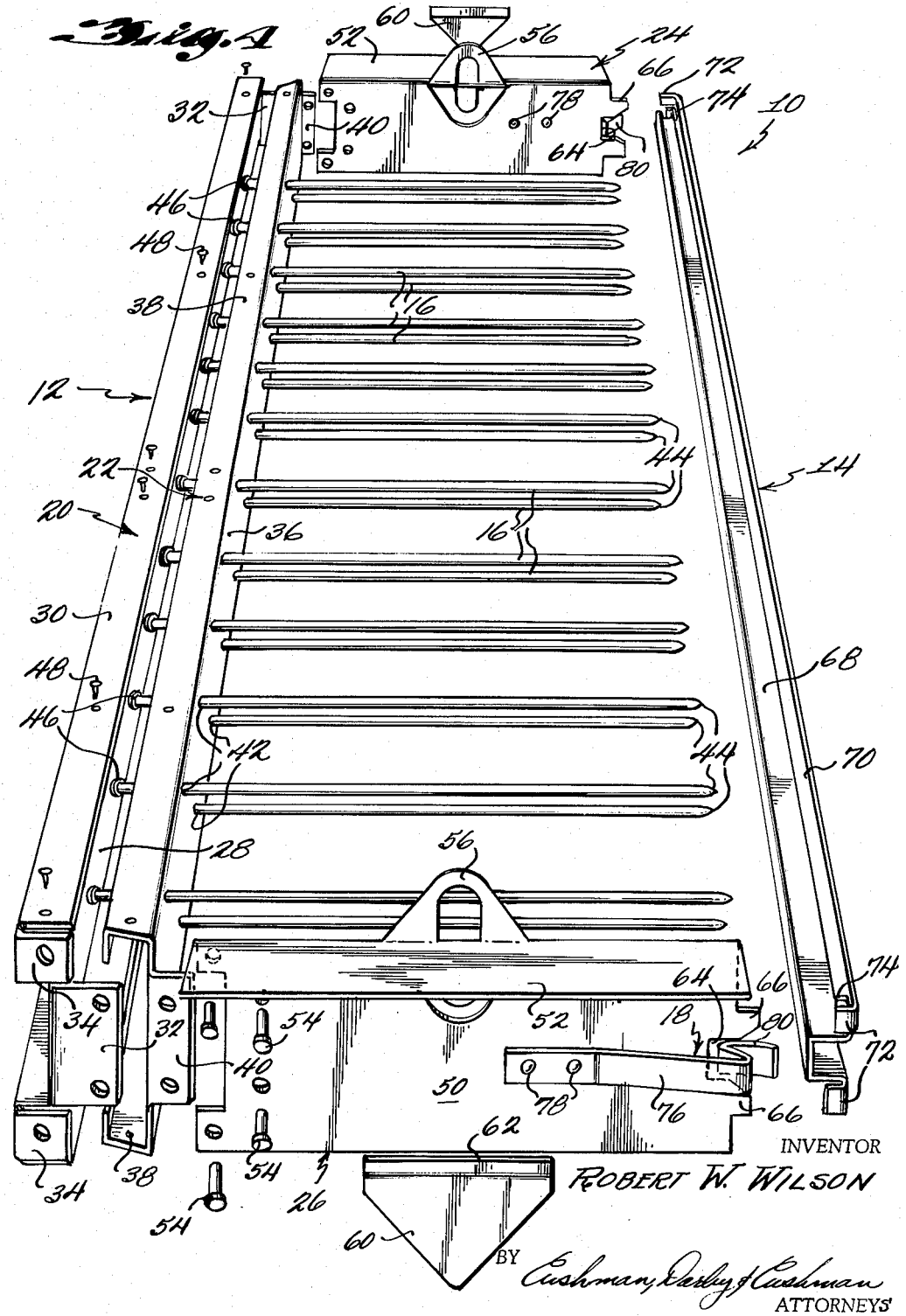

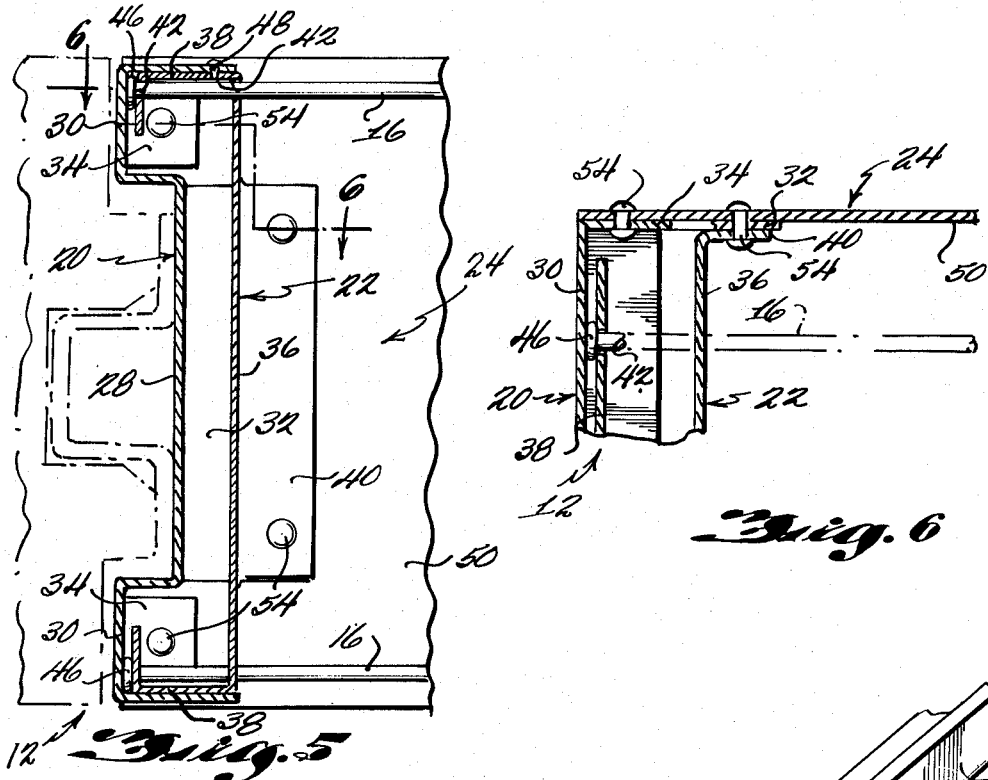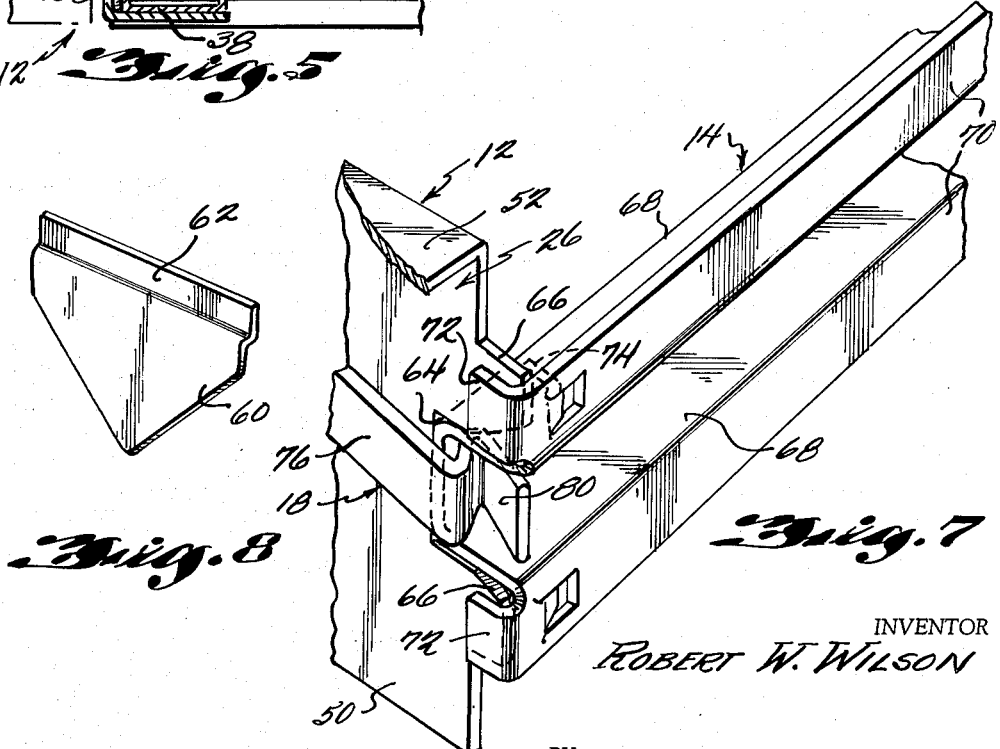

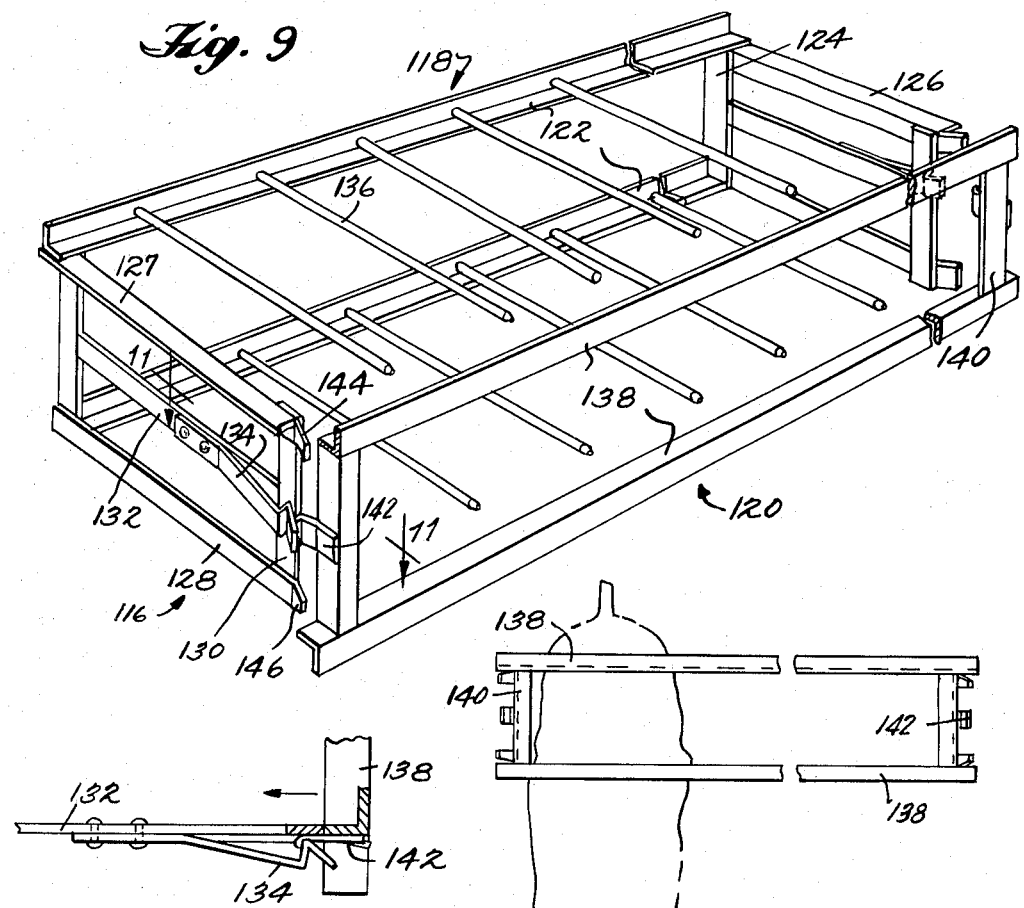
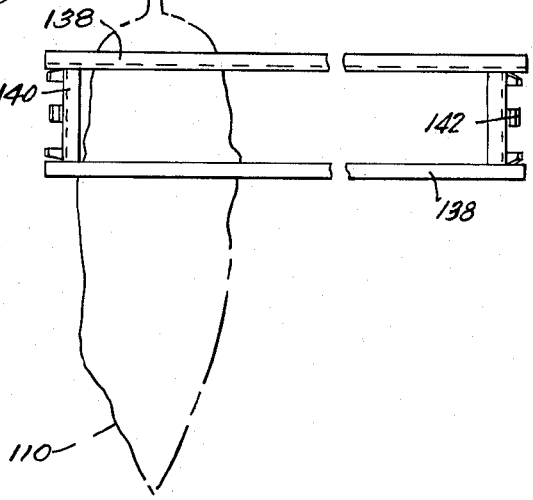
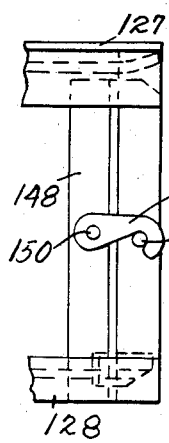

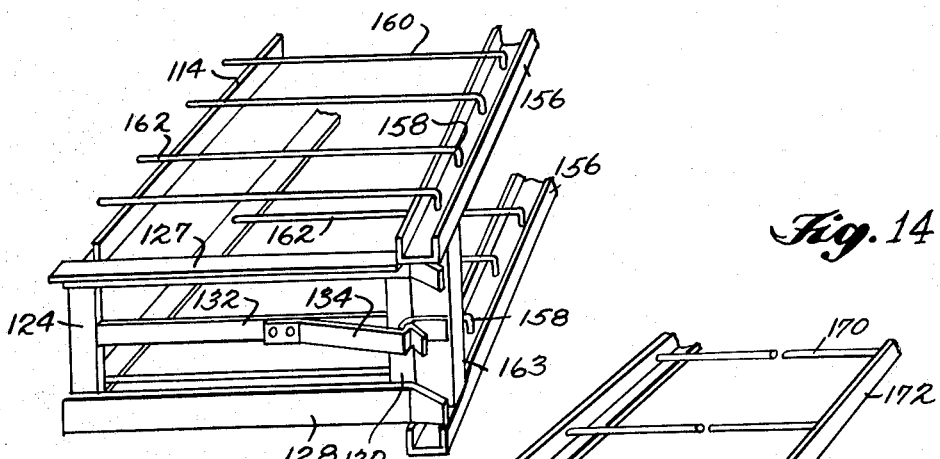
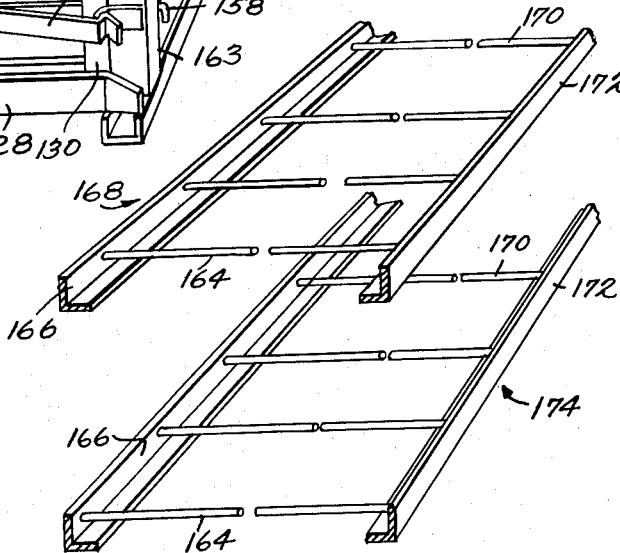
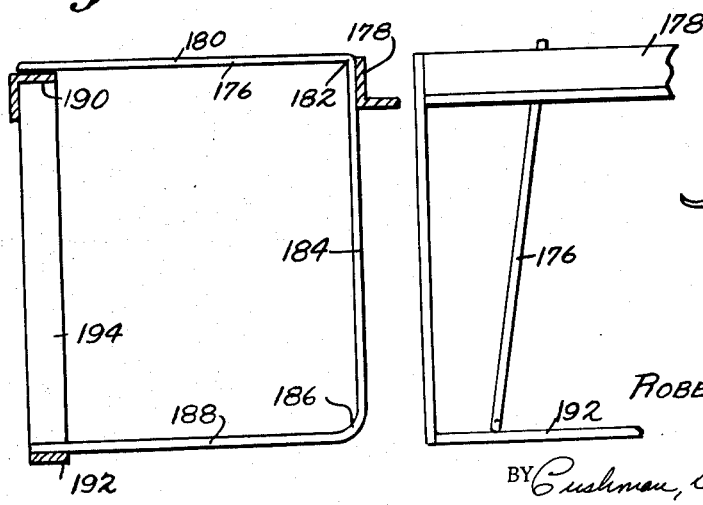
Fig. 13
Fig. 14
Fig. 15
Fig. 16
INVENTOR
ROBERT W. WILSON
BY Cushman, Darby & Cushman
ATTORNEYS

3,244,445
APPARATUS FOR SUPPORTING TOBACCO
LEAVES IN BULK FORM FOR CURING
Robert W. Wilson, Charlotte, N.C., assignor to R. H.
Bouligny, Inc., Charlotte, N.C., a corporation of North
Carolina
Filed Apr. 14, 1964, Ser. No. 359,723
9 Claims. (Cl. 294—5.5)

This invention relates to the handling of tobacco leaves for the purpose of curing and more particularly to improvements in racks for supporting primed tobacco leaves in bulk condition during the curing operation. This application is a continuation-in-part of my earlier copending application, Serial No. 116,368, filed June 12, 1961, entitled, Apparatus for Supporting Tobacco Leaves in Bulk Form for Curing, now abandoned.

Tobacco is conventionally cured by supporting the leaves in tobacco barns where a chemical action is first allowed to take place. Next, heat is applied to stop the chemical action and finally the leaves are dried. The step of placing the leaves into the barn has heretofore required an extensive amount of labor, which labor must be available when needed during the harvesting season but cannot be used year round. That is, the tobacco farmer must have available a sufficient number of hand laborers during the harvesting and barning season and the available of this labor presents serious problems.

In the conventional method of supporting the tobacco leaves in the barn, the leaves which are removed from the plants are first placed in small bunches called hands. These hands are then tied by string onto elongated tobacco sticks and each stick must then be supported in the barn. While there have been many proposals for mechanizing this stringing procedure and for moving the sticks into a proper supported relationship within the barn, these proposals either have never been adopted or they have only served to alleviate the situation somewhat.

In recent years there has been proposed an entirely different system for handling the tobacco leaves and placing them in proper supported position within the curing barn. The system does away with the time-consuming and tedious work of bunching the leaves into hands and then tying the same on sticks. In place of this procedure the proposed system contemplates the use of a rack within which the leaves may be placed in substantially bulk form. While it is preferable to have all of the stems extending in one direction, this is not essential, the only requirement being that all of the leaves have their flat surfaces extending in generally the same direction. The leaves thus placed in the rack are then held in position by piercing prongs, pins, or rods transversely therethrough, the prongs ultimately forming a part of the completed rack.

Also contemplated in this system is the provision of a curing barn within which the racks are supported, which barn having means for establishing a forced air circulation through the tobacco leaves supported in bulk condition within the racks. This forced air circulation is necessary because of the relatively greater amount of leaves which are placed within the same barn space as compared with the conventional procedure wherein the leaves are supported in hands spaced some distance apart.

It will be understood that during the curing operation the tobacco leaves shrink in size mainly due to the loss of moisture in a ratio or from about 6 to 1 to about 8 to 1. One hundred and thirty pounds of primed leaves, after curing, will be reduced in weight to approximately 18 pounds. Moreover, the tobacco becomes limp after a short curing period. All of these conditions present peculiar problems which render the task of supporting the leaves in bulk condition somewhat difficult. Bearing in mind that it is essential that circulation of air be maintained through the leaves and that due to their limp condition they tend to collapse into a mass, if supported from below, any rack for supporting the leaves in bulk condition must be capable of engaging the leaves at their upper portions so that the main portion of the leaves can hang in a limp, depending relation and not become matted into a limp mass which would block air flow.

The present invention relates to improvements in the structure of such racks and more specifically to such structure embodying the optimum essential conditions in a pronged rack for supporting tobacco leaves in bulk condition. A first essential is that the rack include a frame structure providing a hollow interior for receiving the leaves, which interior is open vertically. In order to support the leaves within the rack there must be at least some prongs in the upper eight to ten inches of the leaves and preferably no prongs below the mid-point thereof, bearing in mind that the length of a tobacco leaf is approximately 26 to 28 inches. While the damage to the leaves resulting from the piercing of the prongs through the leaves is not too detrimental, it is desirable to reduce the holes in the leaves formed by the prongs to as few as possible. The pins or prongs employed may be disposed in a single horizontal plane or they may be disposed in spaced horizontal planes. Moreover, considering all of the pins or prongs provided, they should be spaced apart horizontally at least three to six inches with respect to all of the layers or tiers.

Another optimum characteristic of a rack embodying the principles of the present invention aside from its leaf supporting characteristic is that the rack must be so constructed that the prongs can be moved into piercing relation with the leaves or vice versa in a relatively simple manner. To this end, the rack is preferably made in sections permitting free access to the interior thereof, the prongs being either fixed at one end onto one side of the frame or at both sides. Where the prongs are fixed to both sides of the rack they may either come clear across or extend approximately one-half of the distance across. Alternatively the rack frame may be of unitary construction and the prongs separate.

Another optimum characteristic of the present invention is the manner in which the rack is closed into a unitary assembly for ease of handling after the piercing operation has been completed. Where the rack is made of separate frame sections which are moved into cooperating operation during the piercing operation, the frame sections are provided with means for locking the same into cooperating relation in response to their movement together. Alternatively, the frame sections could be locked together by a simple manually actuated latch mechanism.

Finally, a further desirable characteristic is the provision of outwardly projecting structure for supporting the rack in the barn in such a way that the leaves will not be damaged during the movement of the rack into the barn and at the same time insuring optimum air flow once it is in proper position.

Accordingly, it is an object of the present invention to provide a rack for supporting tobacco leaves in bulk condition which embodies the principles enunciated above.

Still another object of the present invention is the provision of a rack for supporting tobacco leaves in bulk condition which provides for optimum support of the leaves in such a way that a maximum air flow therethrough is secured while at the same time minimizing damage to the leaves.

Still another object of the present invention is the provision of a rack for supporting tobacco leaves in bulk condition having prong means embodied therein which can be readily pierced through the leaves or vice versa to support the same.

Still another object of the present invention is the provision of a sectional rack for supporting tobacco leaves in bulk condition embodying improved latch means for securing the rack sections into locked condition after the piercing operation has been performed.

From a structural point of view, it is desirable that a rack embodying the principles of the present invention be of sufficiently sturdy construction to withstand a long period of use. Moreover, it is highly desirable that the weight of the rack be maintained at a minimum so as to facilitate handling when it becomes necessary to lift and support the rack manually, particularly when it has tobacco therein. Of course, it is always desirable to provide the functional and structural features enunciated above in a rack which can be economically produced. The securement of the multiplicity of prongs to the frame constitutes a significant factor in the economies of construction and the simplicity of this step is highly desirable.

Accordingly, it is a further object of the present invention to provide a rack structure which is of sturdy construction but yet light in weight and which is economical to produce, particularly insofar as the securement of the prongs to the frame is concerned.

These and other objects of the present invention will become more apparent during the course of the following detailed description and appended claims.

The invention may best be understood with reference to the accompanying drawings wherein illustrative embodiments are shown.

In the drawings:

FIGURE 1 is a perspective view of a preferred form of bulk curing tobacco rack, embodying the principles of the present invention;

FIGURE 2 is a cross-sectional view taken along the line 2—2 of FIGURE 1;

FIGURE 3 is an end elevational view of the rack, showing a pair of adjacent racks in phantom in operative relation therewith during the curing procedure;

FIGURE 4 is an exploded perspective view of the rack shown in FIGURE 1;

FIGURE 5 is an enlarged fragmentary sectional view taken along the line 5—5 of FIGURE 1, illustrating in phantom an adjacent rack in operative relation thereto;

FIGURE 6 is a sectional view taken along the line 6—6 of FIGURE 5;

FIGURE 7 is an enlarged fragmentary perspective view showing the manner in which the rack sections are latched together;

FIGURE 8 is a perspective view of the cover plate;

FIGURE 9 is a perspective view of another form of rack embodying the principles of the present invention;

FIGURE 10 is a front elevational view of the rack shown in FIGURE 9 showing, in phantom, the outline of a tobacco leaf mounted therein;

FIGURE 11 is a fragmentary sectional view taken along the line 11—11 of FIGURE 9;

FIGURE 12 is a fragmentary end view of the rack shown in FIGURE 9 and illustrating a modified locking means;

FIGURE 13 is a fragmentary perspective view of a further modified form of a rack embodying the principles of the present invention;

FIGURE 14 is a view similar to FIGURE 13 showing a still further modified form of the rack;

FIGURE 15 is a fragmentary vertical sectional view of still another modified form of the rack; and FIGURE 16 is a fragmentary elevational view of the rack illustrated in FIGURE 15.

Referring now more particularly to FIGURES 1–4, there is shown therein a bulk curing tobacco rack, generally indicated at 10. The rack is of the type which may be used with the tobacco harvesting apparatus disclosed in my prior Patent 3,083,517 dated April 2, 1963, and is useful in practicing the bulk curing method disclosed in commonly-assigned Hassler Patent 3,110,326 dated November 12, 1963. The rack 10 comprises a pair of separable frame sections 12 and 14, the frame section 12 being of generally U-shaped configuration and carrying a multiplicity of elongated prongs, spikes, or rods, generally indicated at 16. The separable rack sections are retained together by a pair of latch or locking mechanisms, generally indicated at 18.

As best shown in FIGURE 4, the U-shaped frame section 12 is made up of a pair of contiguous inner and outer side frame members 20 and 22, and a pair of spaced end frame members 24 and 26. As best shown in FIGURES 5 and 6, the outer side frame member 20 is preferably constructed of sheet metal bent to form a straight central web portion 28 and a channel portion 30 at each longitudinal edge of the web portion. As best shown in FIGURES 4 and 5 the central web portion 28 extends beyond the channel portions 30 and is bent over at right angles to provide an attaching flange 32. In a like manner the bight section of each channel portion extends outwardly at each end and is bent over to provide an attaching flange 34.

Referring now to FIGURES 4–6, the inner side frame member 22 is also preferably made of sheet metal bent to form a main web portion 36 having an L-shaped flange portion 38 at each longitudinal edge thereof. As before, the ends of the main web portion 36 extend outwardly from the flange portions 38 and are bent over to provide attaching portions 40. Preferably, the adjacent edges of the flange portions 38 are beveled so as to facilitate engagement of the flange portions 38 within the channel portions 30 of the outer side frame member 20.

The inner side frame member 22 is provided with a series of aligned pairs of prong receiving openings 42 disposed in longitudinally spaced relation with respect to each other. As shown, alternate pairs of openings 42 are formed in the main web portion 36 adjacent one longitudinal edge thereof and in the parallel leg of the associated L-shaped flange portion 38. The remaining pairs of openings are formed in the main web portion 36 adjacent the opposite longitudinal edge thereof and in the parallel leg of the associated flange portion 38. Thus, the openings adjacent one longitudinal edge of the web portion 36 are staggered longitudinally with respect to the openings adjacent the opposite longitudinal edge.

As best shown in FIGURES 5 and 6, each of the prongs 16 is preferably formed from metal stock of circular cross-sectional configuration having one end formed to provide a blunt point 44 and the opposite end interrupted to provide a transverse enlargement or head, indicated at 46. As shown, the head is in the form of an annular flange although it will be understood that the interruption may simply take the form of a pair of diametrically opposed ears or any other desired configuration.

With the construction as described above, the prongs 16 are mounted within the U-shaped frame section 12 by simply feeding successive prongs through successive pairs of aligned openings 42 in the inner side frame member 22 until the head 46 of each prong engages the associated parallel leg section of the flange portion 38. When all of the prongs have been thus assembled, the inner side frame member 22 is then engaged within the outer side frame member 20 so that the outer extremities of the heads 46 engage the inner surface of the bight section of the channel portions 30 of the outer frame member 20. The inner and outer frame members are secured together in the position mentioned above and clearly shown in FIGURE 5 by any suitable means such as a plurality of fastening elements 48 securing the associated outer leg sections of the channel portions 30 with the perpendicular leg sections of the L-shaped flange portions 38.

The end frame members 24 and 26 are of similar construction being substantial mirror images with respect to each other. As shown, each end frame member is preferably made of sheet metal bent to form a main web portion 50 and a flange portion 52 extending outwardly from one longitudinal edge of the web portion 50. Each end frame member is secured adjacent one end to the adjacent end of the assembled outer and inner frame members 20 and 22, by any suitable means, such as fastening elements 54 extending through and rigidly connecting the attaching flanges 32 and 40 with the web portion 50 and attaching flange 34 with the web portion 50.

In order to provide hook means by which the rack 10 may be mechanically handled, as disclosed in Wilson Patent 3,083,517, a centrally apertured generally triangular shaped section 56 is struck from the web portion 50 at a central position adjacent the flange portion 52 and bent, generally along the juncture between the web portion 50 and flange portion 52, so as to extend generally in the plane of the web portion 50.

In order to close the opening in the web portion 50 caused by the triangular section 56, a triangular cover plate 60 is preferably provided. As shown in FIGURES 3, 4 and 8, the cover plate is preferably of generally triangular configuration, having one side 62 offset from the plane of the remaining portion of the plate. The plate 60 is mounted within the opening in the web portion 50 by a wedging action in which the apex of the cover plate is wedged on one side of the web portion 50 and the other two corners of the cover plate are wedged to the opposite surface of the web portion 50. The cover plate plugs the hole in the web portion 50 and prevents passage of air therethrough during operation.

The free end of each web portion 50 is formed with a central generally rectangular notch 64 and a pair of outwardly extending guide sections 66, each having an angular surface which converges inwardly toward the notch 64. The notch 64 and guide sections 66 are adapted to receive the adjacent end of the frame section 14. As shown, the frame section 14 is preferably fabricated by bending sheet metal to form a central channel shaped portion 68 having a flange portion 70 extending from the free longitudinal edge of each leg of the channel portion. The end of each flange portion 70 is bent inwardly, as indicated at 72, to provide a guide section for engaging one side of the associated guide section 66. A cooperating guide section 74 is struck from the adjacent flange portion and bent into parallel relation to the associated guide section 72 for the purpose of engaging the opposite side of the associated guide section 66.

As best shown in FIGURE 7, when the frame section 14 is disposed in operative relation with the frame section 12, the channel portion 68 of the frame section 14 engages within the notches 64 at each end and the associated guide sections 72 and 74 are disposed on opposite sides of the associated guide sections 66. In this way, the frame section 14 is positively retained against movement with respect to the frame section 12 except by a rectilinear movement away from the same. In order to prevent such movement a latch or lock member 76 is provided on each end frame member. As shown, each latch member is secured to the outer surface of the associated web member 50, by any suitable means, such as fastening elements 78. The opposite end of each latch member is bent into a generally hook-shaped configuration as indicated at 80, which hook portion engages over the adjacent end of the channel portion 68 of the frame section 14 to prevent outward rectilinear motion thereof with respect to the frame section 12. It will be understood that the latch member 76 is preferably made of spring steel so that the latch portion 80 tends to be retained in a latched position and is cammed outwardly by the engagement of the adjacent end of the frame section 14 with the adjacent extremity of the hook portion 80. When the channel portion has been moved into full engagement within the notch 64, it passes beyond the extremity of the hook portion enabling the same to move inwardly under its own spring bias to retain the frame section 14 against outward rectilinear motion.

It will be understood that the rack 10 as described above may be used in conjunction with the tobacco harvesting apparatus disclosed in Wilson Patent 3,083,517 in lieu of the rack structure 16 illustrated therein. Once the rack is filled with tobacco leaves in the manner described in the above-mentioned Wilson patent it is used in conjunction with a barn structure preferably in the manner described in Wilson application Serial No. 200,615, filed June 5, 1962, now Patent No. 3,134,583 which application is a division of the aforesaid Wilson Patent 3,083,517. Moreover, when filled with leaves the point end portions of the uppermost row of prongs is supported by the upper surface of the channel portion 68. It will also be understood that the rack structure of the present invention may be utilized in the manner disclosed in commonly-assigned Hassler Patent 3,110,326, in lieu of the rack structure 24 disclosed therein. Thus the rack 10 of the present invention can also be readily employed in a barn site loading procedure, such as described in connection with FIGURE 6 of the Hassler patent.

It will be noted that the structure of the rack 10 described above provides a very durable and sturdy construction primarily because of the channel or angle iron configuration of the main frame members of the rack. The manner in which the headed prongs are assembled to the side frame members of the rack provides adequate support and securement for the prongs while at the same time eliminating the necessity of a welding operation for each operation or the securement of a fastening element to each prong. In its assembled condition, the sturdy rack construction is provided with a minimum amount of frame material, thus obtaining an optimum weight characteristic. Another advantageous feature of the present rack structure in operation resides in the fact that one side frame member is complementary to the opposite side frame member so that when a plurality of racks is mounted in the curing barn in side-by-side relation adjacent side frame members will coact together to effectively prevent movement of air therebetween. As shown in FIGURES 3 and 5, the side frame member 14 constitutes an effective tongue member which engages within an effective groove formed by the channel portions 30 and the web portion 28 of the side frame member 20. The longitudinal extent of this tongue and groove connection is important, in that each side of the rack still presents a flat straight surface which can engage, either the inner end wall or the wall of the door of the curing chamber, to prevent escape of air past the extremities of the group of racks in the curing chamber of the barn during operation.

Referring to FIGURE 9, there is shown therein a rack 116 which illustrates one embodiment of the principles of the present invention enumerated above. The rack 116 comprises a first frame section, indicated generally at 118, and a second frame section, indicated generally at 120. First frame 118 has a pair of horizontal angle members 122 spaced apart and parallel to each other. Attached to the ends of angle members 122 are vertical bar members 124 parallel to each other and perpendicular to angle members 122. Angle members 124 may be fastened to angle members 122 as by welding or other suitable means. Angle members 126 extend perpendicularly outwardly from the upper junction points of angle members 122 and bar members 124 and are fastened thereto by welding or other suitable means. Angle members 126 are positioned such that their horizontal flanges 127 extend outwardly from the hollow interior of the frame 116, and are adapted for engaging complementary flanges on the sides of the curing barn for supporting the rack.

Extending outwardly and perpendicularly from the lower junction points of angle members 122 and bar members 124 are bars 128 parallel to angle members 126 and of like length. A pair of bar means 130 parallel to bar members 124 connect the outer extremities of angle members 126 and bars 128 and are fastened thereto by welding or other suitable means. Connected to the midpoints of bar members 124 and 130, and extending therebetween are bars 132. Fastened to bars 132 by rivets or other fastening means are spring latches 134 (see FIGURE 11).

Attached to angle members 122 at equally spaced intervals along the length thereof are rods 136 extending perpendicular therefrom and parallel to angle members 126 and bars 128 and 132. The rods attached to the upper angle member 122 are preferably staggered with respect to the rods attached to the lower angle member. Also, the prongs 136 are attached to members 122 in such a manner that their free ends are raised slightly above an imaginary horizontal plane defined by members 126 and 127 and passing through the points of fastening thereof. The object of such a construction is that when loaded with tobacco leaves, the prongs will bend downwardly into receiving engagement with the horizontal flanges of angle members 138 on frame section 120.

Second frame 120 comprises a pair of horizontal angle members 138 parallel to each other and spaced apart a distance similar to that between angle members 122 of first frame 118. Secured to the ends of angle members 138 are vertical angle members 140 parallel to each other and spaced apart a distance similar to that between bar members 124 of first frame 118. At approximately the mid-point of angle members 140 are fastened flange means 142 for receiving the spring latches 134 on first frame 118.

The extremities of angle members 126 and bars 130 are bent outwardly as at 144 and 146, respectively, in order that second frame 120 might be more easily guided into closing positions with first frame 118.

Another modification of the locking means just described is illustrated in FIGURE 12. In this modification, bars 132, spring latches 134, and flange means 142 are replaced with vertical bar 148, pin 150, hook 152 and peg 154. Vertical bar 148 is fastened by welding or other suitable means to angle member 126 and bar 128 adjacent bar means 130 and parallel thereto. Approximately at the mid-point of vertical bar 148 is located pin 150 to which hook 152 is swively attached. Peg 154 is located approximately at the middle of angle member 140 on second frame 120 and is positioned to receive the end of hook 152.

FIGURE 13 discloses a modification of the frame means described above particularly with reference to FIGURE 9. In this modification, frame means comprising upright channels 156 and angle members 114 are held together in disengageable fashion as by the spring latch of the frame shown in FIGURE 9. The upright channel members 156 are adapted to receive the bent ends 158 of rods 160, while the opposite ends 162 of rods 160 rest on the angle members 114.

FIGURE 14 discloses still a further modification of the present invention having the same general frame construction as the rack 116 of FIGURE 9. The rods 164 extend outwardly from and perpendicular to angle members 166 on first frame 168, and rods 170 extend outwardly from and perpendicular to angle members 172 of second frame 174. Rods 164 and 170 are of approximately half the length of rods 136 (see FIGURE 9) such that when first frame 168 is attached to second frame 174, the free ends of rods 164 will reach approximately half the distance across the interior of the hollow rack. It should be noted that in this modification the closure means of either FIGURE 11 or FIGURE 12 might be employed.

FIGURES 15 and 16 illustrate still another modification of the frame means shown in FIGURE 9. In this embodiment a plurality of U-shaped prongs 176 are suitably attached to angle members 178 at equally spaced intervals. Each prong 176 has a first horizontal length 180 which is bent first at 182 into a generally vertical portion 184 and is bent again at 186 into a second horizontal length 188 which extends in the same direction as the first horizontal length 180 and is parallel thereto. Angle member 190 and bar member 192 parallel to each other and spaced apart by angle members 194 suitably fastened to the ends thereof, are located to receive the free ends of horizontal lengths 180 and 188 of rods 176.

A further modification, not illustrated, might comprise a first frame similar to that shown in FIGURE 9. In place of frame section 120 shown therein, however, there is provided a frame section covered with wire screening having a mesh with openings which are slightly larger than the prongs 136, such that, as the screened section is moved into engagement with section 118, the tips of prongs 136 are received within the mesh openings and supported thereby.

In using the device shown in FIGURE 9, the newly harvested leaves 110 are placed within the first frame in a position generally parallel to the plane defined by members 122 and 124 as shown in FIGURE 10. They are pierced by the ends of the rods and slid along the rods toward members 122. This process is continued until the frame is completely filled.

Second frame section 120 is then moved into position such that the free ends of rod 136 rest upon the horizontal positions of angle members 138. As the section 120 is moved toward section 118, flange members 142 engage latch members 134 and hold the sections together in secured fashion. The rack means is now ready for placement within the curing barn. After the curing process is completed and it is desired to remove the leaves from the rack, frame 120 can be released from frame 118 by bendably moving spring latch 34 out of engagement with flange 142 and removing it therefrom.

Referring to the modification of FIGURE 13, the harvested tobacco leaves are held in position between frame members 114 and 156 whereupon they are pierced by the rods 160 which are forced through the entire bundle or stack of tobacco leaves until the piercing ends 162 of the rods 160 come to a rest position on angle member 114. The bent ends 158 of the rods are then placed within the groove of channel member 156.

In loading the tobacco into the rack of the modification of FIGURE 16, the leaves are placed in each of the frames 168 and 172 until filled, whereupon each of the frames is connected to the other by the fastening means of either FIGURE 13 or FIGURE 14 and then loaded into the barn in a manner similar to that employed in loading rack means 116.

When loading the frames of the modification shown in FIGURES 15 and 16, the leaves are first pierced by the tips of prong portions 180 and 188, and then slid along the prongs until they rest adjacent portion 184 of the U-shaped prong 176. The free ends of the rods are then located so as to rest upon angle member 190 and bar member 192, the first frame comprising angle member 178 and rods 176 being fastened to the second frame comprising angle member 190, bar member 192 and angle members 194 as by either of the fastening means shown in FIGURES 13 and 14.

A rack means for supporting tobacco leaves in bulk form has been disclosed consisting of a first frame and a second frame and complementary means on each of said frames whereby said first frame receives said second frame in an engaging manner and wherein said second frame may be easily released from said first frame.

Many various modifications may be made in my invention as hereinabove described, and many apparently widely different embodiments of the same made within the embodiments and scope of the claims without departing therefrom; it is intended that all matter contained in the accompanying specification is to be treated as being illustrative only and not in a limiting sense.

I claim:

1. A rack for supporting a batch of tobacco leaves in compressed bulk form for passage of a flow of forced air vertically therethrough comprising (a) a pair of separable rack sections disposable in spaced relation with respect to each other in a loading position with a batch of tobacco leaves positioned therebetween in loose bulk form having the flat surfaces thereof disposed generally in the same direction, (b) a plurality of parallel elongated prongs fixedly secured at one of their ends to one of said rack sections and extending in a direction toward the other of said rack sections when the latter are disposed in said loading position, (c) said rack sections being movable from said loading position rectilinearly toward each other in the direction of extent of said prongs into an operatively engaged position to pierce the free ends of said prongs through the leaves in a direction perpendicular to at least a substantial portion of the flat surfaces thereof and to compress the batch of leaves in loose bulk form into a relatively compact batch on said prongs, (d) interengaging guide and abutment means carried by said rack sections adjacent each of the end portions thereof operable during the movement of said rack sections from said loading position to said operatively engaged position to guide said rack sections into proper alignment in directions perpendicular to the extent of said prongs and to prevent movement between said rack sections in directions perpendicular to said prongs when the rack sections are disposed in said operatively engaged position, (e) interengaging spring latch parts carried by said rack sections adjacent each of the end portions thereof engageable in response to the movement of said rack sections into said operatively engaged position to prevent movement between said rack sections away from each other in the direction of extent of said prongs and manually disengageable to permit movement of said rack sections out of said operatively engaged position, and (f) means on said rack sections defining spaced supporting surfaces facing in a direction perpendicular to the direction of extent of said prongs when the rack is in an operatively engaged curing position for passage of the flow of forced air vertically through the batch of leaves supported therein, (g) said rack sections in the operatively engaged curing position of the rack including horizontally inwardly facing peripheral surface means for exteriorly peripherally supporting the batch of compressed leaves with their flat surfaces extending in the direction of the forced air flow, (h) said prongs in the operatively engaged curing position of the rack extending horizontally substantially throughout the space bounded by said inwardly facing peripheral surface means and being spaced apart relative to each other in said space to provide interior support to the batch of leaves for vertical positions within the upper eight to ten inches of the leaves and at horizontal positions spaced at least from three to six inches apart.

2. A rack as defined in claim 1 wherein said prongs are disposed in two rows spaced vertically from each other when the rack is disposed in said operatively engaged curing position, the prongs of each row being staggered horizontally with respect to the prongs of the other row.

3. A rack for supporting a batch of tobacco leaves in compressed bulk form for passage of a flow of forced air vertically therethrough comprising (a) a first rack section including (b) an elongated side frame structure and (c) end frame structures rigidly secured with respect to the ends of said side frame structure and extending perpendicularly therefrom, (d) a plurality of parallel elongated prongs fixedly secured at one end to said side frame structure and extending therefrom in parallel relation with said end frame structures between the latter, (e) a second rack section including (f) an elongated side frame structure, (g) said first and second rack sections being separable for disposition in spaced relation with respect to each other in a loading position with a batch of tobacco leaves in loose bulk form having the flat surfaces thereof disposed generally in the same direction positioned therebetween and movable from said loading position rectilinearly toward each other in the direction of extent of said prongs into an operatively engaged position to pierce the free ends of said prongs through the leaves in a direction perpendicular to at least a substantial portion of the flat surfaces thereof and to compress the batch of leaves in loose bulk form into a relatively compact batch on said prongs, (h) interengaging guide and abutment means on each of said end frame structures and the associated end portion of said second rack section operable during the movement of said rack sections from said loading position to said operatively engaged position to guide said rack sections into proper alignment in directions perpendicular to the extent of said prongs and to prevent movement between said rack sections in directions perpendicular to said prongs when the rack sections are disposed in said operatively engaged position, (i) interengaging spring latch parts on each of said end frame structures and the associated end portion of said second rack section engageable in response to the movement of said rack sections into said operatively engaged position to prevent movement between said rack sections away from each other in the direction of extent of said prongs and manually disengageable to permit movement of said rack sections out of said operatively engaged position (j) each of said end frame structures including an outwardly extending elongated flange defining a supporting surface facing in a direction perpendicular to the direction of extent of said prongs and positioned to be engaged horizontally when the rack is in an operatively engaged curing position for passage of the flow of forced air vertically through the batch of leaves supported therein, (k) said side frame structures and said end frame structures in the operatively engaged curing position of said rack including horizontally inwardly facing peripheral surface means for exteriorly peripherally supporting the batch of compressed leaves with the flat surfaces extending in the direction of forced air flow, (l) said prongs in the operatively engaged curing position of the rack extending horizontally substantially throughout the space bounded by said inwardly facing peripheral surface means and being spaced apart relative to each other in said space to provide interior support to the batch of leaves at vertical positions within the upper eight to ten inches of the leaves and at horizontal positions spaced at least from three to six inches apart.

4. A rack as defined in claim 3 wherein said first rack section side frame structure includes inner and outer side frame members, said inner side frame member having means defining longitudinally spaced pairs of transversely spaced aligned prong receiving openings, each of said prongs being slidably mounted within a pair of said aligned openings and having a head portion disposed outwardly of the outermost opening of the associated pair, said outer side frame member being fixedly secured to said inner side frame member with the head portion of each of said prongs abuttingly engaged therebetween.

5. A rack as defined in claim 4 wherein said inner side frame member is formed of an elongated sheet of metal bent to form a central web portion having an L-shaped flange portion extending from each longitudinal edge of said central web portion, said pairs of aligned openings being formed in the outer legs of said flange portions and said web portion.

6. A rack as defined in claim 5 wherein said outer side frame member is formed of a sheet of metal bent to provide a central web portion having a channel portion extending from each longitudinal edge thereof, said channel portions receiving said flange portions of said inner side frame members, said second rack section side frame structure comprising a side frame member formed of sheet metal bent to provide a central channel portion having a flange portion extending from the outer longitudinal edge of each leg thereof, said second rack section side frame member being of a size to engage within and between the channel portions of said outer side frame member.

7. A rack structure as defined in claim 3 wherein one of said side frame structures define a longitudinal extending groove in the exterior thereof, the other of said side frame structures defining an exterior longitudinally extending tongue of a size to engage within said longitudinally extending groove.

8. A rack structure as defined in claim 3 wherein each of said end frame structures is formed of a sheet of metal bent to provide a main web portion and a flange portion constituting said flange, said web portion having an apertured section struck therefrom and bent approximately 180° from the plane of said web portion and a cover plate wedgingly retained within the opening formed in the web portion as a result of said apertured section, said apertured sections extending above said flanges when said rack is in said operative curing position and providing means through which said rack can be handled.

9. A rack for supporting a batch of tobacco leaves in compressed bulk form for passage of a flow of forced air vertically therethrough comprising
 (a) a first rack section including
  (b) an elongated side frame structure and
  (c) end frame structures rigidly secured with respect to the ends of said side frame structure and extending perpendicularly therefrom,
 (d) a plurality of parallel elongated prongs fixedly secured at one end to said side frame structure and extending therefrom in parallel relation with said end frame structures between the latter,
 (e) a second rack section including
  (f) an elongated side frame structure,
 (g) said first and second rack sections being separable for disposition in spaced relation with respect to each other in a loading position with a batch of tobacco leaves in loose bulk form having the flat surfaces thereof disposed generally in the same direction positioned therebetween and movable from said loading position rectilinearly toward each other in the direction of extent of said prongs into an operatively engaged position to pierce the free ends of said prongs through the leaves in a direction perpendicular to at least a substantial portion of the flat surfaces thereof and to compress the batch of leaves in loose bulk form into a relatively compact batch on said prongs,
 (h) interengaging guide and abutment means on each of said end frame structures and the associated end portion of said second rack section operable during the movement of said rack sections from said loading position to said operatively engaged position to guide said rack sections into proper alignment in directions perpendicular to the extent of said prongs and to prevent movement between said rack sections in directions perpendicular to said prongs when the rack sections are disposed in said operatively engaged position,
 (i) locking means carried by said rack sections adjacent each of the end portions thereof engageable when said rack sections are in said operatively engaged position to prevent movement between said rack sections away from each other in the direction of extent of said prongs and disengageable to permit movement of said rack sections out of said operatively engaged position,
 (j) each of said end frame structures including an outwardly extending elongated flange defining a supporting surface facing in a direction perpendicular to the direction of extent of said prongs and positioned to be engaged horizontally when the rack is in an operatively engaged curing position for passage of the flow of forced air vertically through the batch of leaves supported therein,
 (k) said side frame structures and said end frame structures in the operatively engaged curing position of said rack including horizontally inwardly facing peripheral surface means for exteriorly peripherally supporting the batch of compressed leaves with the flat surfaces extending in the direction of forced air flow,
 (l) said prongs in the operatively engaged curing position of the rack extending horizontally substantially throughout the space bounded by said inwardly facing peripheral surface means and being spaced apart relative to each other in said space to provide interior support to the batch of leaves at vertical positions within the upper eight to ten inches of the leaves and at horizontal positions spaced at least from three to six inches apart.

References Cited by the Examiner
UNITED STATES PATENTS

| | | | |
|---|---|---|---|
| 912,902 | 2/1909 | Sharon | 294—5.5 |
| 1,522,489 | 1/1925 | Bolen | 294—5.5 |
| 2,808,283 | 10/1957 | Vickers | 294—5.5 |

GERALD M. FORLENZA, *Primary Examiner.*

G. ABRAHAM, *Assistant Examiner.*